(12) United States Patent
Vignerol et al.

(10) Patent No.: US 11,408,535 B2
(45) Date of Patent: Aug. 9, 2022

(54) VALVE AND RESERVOIR(S) FOR PRESSURIZED FLUID

(71) Applicant: L'Air Liquide, Société Anonyme pour l'Etude et l'Exploitation des Procédés Georges Claude, Paris (FR)

(72) Inventors: Samuel Vignerol, Fontenay le Fleury (FR); Antoine Frenal, Ezanville (FR); Denis Muller, Rueil Malmaison (FR); Hervé Paoli, Rueil Malmaison (FR); Morgan Lamiable, Metzer Visse (FR); Johan Broechler, Villerupt (FR); Claudio Di Filippo, Noisseville (FR)

(73) Assignee: L'Air Liquide, Société Anonyme pour l'Étude et l'Exploitation des Procédés Georges Claude, Paris (FR)

( * ) Notice: Subject to any disclaimer, the term of this patent is extended or adjusted under 35 U.S.C. 154(b) by 106 days.

(21) Appl. No.: 16/652,863

(22) PCT Filed: Aug. 2, 2018

(86) PCT No.: PCT/FR2018/052001
§ 371 (c)(1),
(2) Date: Apr. 1, 2020

(87) PCT Pub. No.: WO2019/068973
PCT Pub. Date: Apr. 11, 2019

(65) Prior Publication Data
US 2020/0318744 A1    Oct. 8, 2020

(30) Foreign Application Priority Data

Oct. 5, 2017  (FR) ...................................... 1701024
Oct. 5, 2017  (FR) ...................................... 1701025

(51) Int. Cl.
*F16K 31/524* (2006.01)
*F15B 20/00* (2006.01)
(Continued)

(52) U.S. Cl.
CPC ........ *F16K 31/52408* (2013.01); *F15B 20/00* (2013.01); *F16K 1/302* (2013.01);
(Continued)

(58) Field of Classification Search
CPC .. F16K 31/52408; F16K 31/602; F16K 1/303; F16K 1/302; F16K 1/304;
(Continued)

(56) References Cited

U.S. PATENT DOCUMENTS 1,395,678 A  * 11/1921  Jones ..................... F16K 35/10
                                                         70/180
1,944,456 A    1/1934  Pearson
(Continued)

FOREIGN PATENT DOCUMENTS

EP    3 062 005    8/2016
FR    2 790 299    9/2000
(Continued)

OTHER PUBLICATIONS

International Search Report and Written Opinion for corresponding PCT/FR2018/052001, dated Nov. 20, 2018.
(Continued)

*Primary Examiner* — Patrick C Williams
(74) *Attorney, Agent, or Firm* — Elwood L. Haynes

(57) ABSTRACT

A valve for pressurized fluid including a body housing a fluid circuit having an upstream end configured to be placed in communication with a reserve of pressurized fluid and a downstream end configured to be placed in communication with a user of fluid, the circuit including a collection of valve shutter(s) including at least one shutoff valve shutter allow-
(Continued)

ing the circuit to be closed or opened, the valve including a member for manually controlling the collection of valve shutter(s).

11 Claims, 5 Drawing Sheets

(51) Int. Cl.
*F16K 31/60* (2006.01)
*F16K 1/44* (2006.01)
*F16K 35/02* (2006.01)
*F16K 35/14* (2006.01)
*F17C 13/04* (2006.01)
*F16K 1/30* (2006.01)
*F17C 1/00* (2006.01)
*F15B 15/26* (2006.01)

(52) U.S. Cl.
CPC .............. *F16K 1/303* (2013.01); *F16K 1/304* (2013.01); *F16K 1/443* (2013.01); *F16K 31/602* (2013.01); *F16K 35/025* (2013.01); *F16K 35/14* (2013.01); *F17C 1/00* (2013.01); *F17C 13/04* (2013.01); *F15B 2015/267* (2013.01); *F17C 2201/0109* (2013.01); *F17C 2201/032* (2013.01); *F17C 2201/058* (2013.01); *F17C 2203/0617* (2013.01); *F17C 2205/035* (2013.01); *F17C 2205/0326* (2013.01); *F17C 2205/0329* (2013.01); *F17C 2205/0385* (2013.01); *F17C 2205/0394* (2013.01); *F17C 2221/011* (2013.01); *F17C 2223/0123* (2013.01); *F17C 2223/036* (2013.01); *F17C 2223/043* (2013.01); *F17C 2227/044* (2013.01); *F17C 2250/043* (2013.01); *F17C 2260/021* (2013.01); *F17C 2260/044* (2013.01); *F17C 2260/056* (2013.01)

(58) Field of Classification Search
CPC ........ F16K 1/443; F16K 35/025; F16K 35/14; F17C 1/00; F17C 13/04; F17C 2201/032; F17C 2201/058; F17C 2201/0109; F17C 2223/043; F17C 2223/123; F17C 2223/036; F17C 2260/021; F17C 2260/044; F17C 2260/056; F17C 2205/0326; F17C 2205/0329; F17C 2205/035; F17C 2205/0385; F17C 2205/0394; F17C 2250/043; F17C 2203/0617; F17C 2221/011; F17C 2227/044; F15B 20/00; F15B 2015/267
See application file for complete search history.

(56) References Cited

U.S. PATENT DOCUMENTS

| | | | |
|---|---|---|---|
| 2,709,452 A | 5/1955 | Calabrese | |
| 3,737,140 A | 6/1973 | Toth | |
| 4,429,711 A * | 2/1984 | Schomer | F16K 35/14 137/385 |
| 5,615,707 A * | 4/1997 | Pfannenschmidt | F16K 35/14 137/614.05 |
| 6,035,463 A | 3/2000 | Pawelzik et al. | |
| 6,086,045 A * | 7/2000 | Moon | F16K 35/025 251/114 |
| 2004/0231729 A1 | 11/2004 | Lang et al. | |
| 2005/0173007 A1 | 8/2005 | Cannet et al. | |
| 2006/0090795 A1* | 5/2006 | Chan | F16K 1/303 137/446 |
| 2006/0175569 A1 | 8/2006 | Henson | |
| 2013/0056665 A1* | 3/2013 | Nimberger | F16K 31/52408 251/251 |
| 2014/0048169 A1 | 2/2014 | Pisot et al. | |
| 2016/0153617 A1 | 6/2016 | Mellors | |
| 2017/0101304 A1* | 4/2017 | Geipel | B67D 7/42 |

FOREIGN PATENT DOCUMENTS

| | | |
|---|---|---|
| FR | 2 793 297 | 11/2000 |
| FR | 2 828 922 | 2/2003 |
| FR | 2 840 664 | 12/2003 |
| FR | 2 974 402 | 10/2012 |
| GB | 441 279 | 7/1924 |
| GB | 834 759 | 8/1958 |
| WO | WO 2016 146743 | 3/2016 |

OTHER PUBLICATIONS

International Search Report and Written Opinion for related PCT/FR2018/052005, dated Nov. 20, 2018.
International Search Report and Written Opinion for related PCT/FR2018/052002, dated Nov. 23, 2018.
International Search Report and Written Opinion for related PCT/FR2018/052003, dated Nov. 23, 2018.
International Search Report and Written Opinion for related PCT/FR2018/051994, dated Dec. 19, 2018.
International Search Report and Written Opinion for related PCT/FR2018/051995, dated Dec. 19, 2018.
International Search Report and Written Opinion for related PCT/FR2018/052000, dated Dec. 19, 2018.

* cited by examiner

VALVE AND RESERVOIR(S) FOR PRESSURIZED FLUID

CROSS REFERENCE TO RELATED APPLICATIONS

This application is a 371 of International Application PCT/FR2018/052001, filed Aug. 2, 2018, which claims priority to French Patent Application Nos. 1701024 and 1701025, both filed Oct. 5, 2017, the entire contents of which are incorporated herein by reference.

BACKGROUND

The invention relates to a valve and to a reservoir or collection of reservoirs for pressurized fluid.

The invention relates more particularly to a valve for pressurized fluid comprising a body housing a fluid circuit having an upstream end intended to be placed in communication with a reserve of pressurized fluid and a downstream end intended to be placed in communication with a user of fluid, the circuit comprising a collection of valve shutter(s) comprising at least one shutoff valve shutter allowing the circuit (3) to be closed or opened, the valve comprising a member for manually controlling the collection of valve shutter(s), the control member being mounted with the ability to move on the body between a rest position in which the collection of valve shutter(s) is in a position in which the circuit is closed and an active position in which the control member actuates the collection of valve shutter(s) into a position in which the circuit is open with a first bore section, the valve comprising a mechanism for locking the control member in its rest position, the locking mechanism comprising a manual actuator mounted with the ability to move on the body between a locked first position that locks the control member to prevent it from moving from its rest position toward its active position, and a second position in which the control member is unlocked allowing it to move from its rest position toward its active position.

For safety reasons, it is known practice to provide a mechanism for locking the control member for manually controlling the opening of an isolation valve shutter of a valve for (a) pressurized gas cylinder(s) (see for example FR2793297A1).

One problem with the valves of this type, notably lever valves or valves with a rotary control member of the "quarter-turn" type is the risk of the valve shutter opening too suddenly. This may actually generate a significant pressure surge on the downstream equipment connected thereto. This sudden rise in pressure may also occur with valves operated by a handwheel when the operator turns the hand wheel too quickly.

This pressure spike may damage a pressure regulator situated downstream simply through the effect that the pressure has on the regulating mechanism (mechanical damage, leaks from the regulator, loss of calibration of the regulating characteristics, etc.). In instances in which the gas is a fuel oxidizer (oxygen), adiabatic compression (sharp increase in temperature) may arise and cause the nonmetallic elements of the regulator (seal, seat made of plastic) to ignite.

One known solution for consists in providing for gradual opening of the valve via a mechanism of two concentric valve shutters actuated sequentially by the lever, see EP3062005A1.

These solutions provide only an imperfect answer to this problem.

SUMMARY

One object of the present invention is to alleviate all or some of the above-mentioned drawbacks of the prior art.

To this end, the valve according to the invention, in other respects in accordance with the generic definition thereof given in the above preamble, is essentially characterized in that, in its unlocked second position, the actuator actuates the collection of valve shutter(s) into a position in which the circuit is open to a second bore section.

The valve allows the users to open a gas cylinder or a collection (rack) of gas cylinders at high pressure (for example between 150 and 300 bar or more) progressively, reducing the rate at which any equipment positioned downstream of the valve becomes pressurized.

The valve also affords safety against unwanted opening of the valve.

Furthermore, embodiments of the invention may comprise one or more of the following features:

- the second bore section is smaller than the first bore section,
- the actuator comprises at least one of the following: a lever articulated to the body, a push-button to be moved in translation, a rotary actuator such as a handwheel or a knob,
- the control member comprises at least one of the following: a lever articulated to the body, a push-button to be moved in translation, a rotary actuator such as a handwheel or a knob,
- the movement of the control member from its rest position toward its active position describes a movement of a different nature or in a distinct direction, notably in an opposite direction, compared with the movement of the actuator moving from its a locked first position toward its unlocked second position,
- the valve comprises a return member returning the actuator toward its locked first position,
- the valve comprises a retaining mechanism providing stable retention of the control member at least in its active position,
- the valve comprises a coupling mechanism that couples the movement of the control member and of the actuator when the control member is moved from its active position toward its rest position and/or from its rest position toward its active position, the coupling mechanism automatically moving the actuator when the control member is moved,
- the collection of valve shutter(s) comprises two distinct shut-off valve shutters able to move with respect to respective seats and in the open position respectively defining the two distinct bore sections, the two valve shutters being controlled by the control member and by the actuator, respectively,
- the two distinct shut-off valve shutters are arranged in series in the one same line of the circuit,
- the two shutoff valve shutters are controlled by at least one mobile pushrod controlled by the control member and by the actuator,
- movement of the actuator from its locked first position toward its unlocked second position moves the pushrod over a first travel that actuates the opening of a first valve shutter(s) into an open position with the second bore section for the circuit, the subsequent movement of the control member from its rest position toward its active position moving the pushrod over a second travel actuating the opening of the second valve shutter into a position in which the circuit is open with the first bore section, the mechanism for locking the control member in its rest position comprises a mobile mechanical stop, the control member is a lever articulated to the body, the locking mechanism that locks the control member in its rest position acts on a cam attached to the lever, the locking mechanism that locks the control member in its rest position comprises a mechanical stop between a profile of the cam of the control member and a mobile member of a mechanism transmitting movement between the cam and the collection of valve shutter(s), the actuator is a lever articulated to the body, the two levers are articulated to the body and each comprise a respective cam having a respective cam profile and collaborating with at least one mobile pushrod for control of the collection of shutoff valve shutter(s), the coupling mechanism that couples the movement of the control member and of the actuator is incorporated into the cams of the levers, the coupling mechanism that couples the movement of the control member and of the actuator comprises a rod attached to at least one cam and at least one groove formed in the other cam and that accommodates and guides the rod, actuation of the collection of valve shutter(s) by the actuator into the position in which the circuit is open to the second bore section is achieved via a device for transmitting force between the actuator and the collection of valve shutter(s), it being possible for at least part of this force transmission device to form part of the locking mechanism, actuation of the collection of valve shutter(s) by the control member is achieved via a device for transmitting force between the control member and the collection of valve shutter(s), it being possible for a part of this force transmission device to form part of the locking mechanism, the configuration of the collection of valve shutters in the position in which the circuit is open to the second bore section is achieved when the control member is in its rest position and at the same time the actuator is moved into its unlocked second position, the ratio between the second bore section and the first bore section is comprised between 1/50 and 1/2 or between 1/100 and 1/20, and preferably between 1/10 and 1/5 or between 1/80 and 1/30, the actuator and the control member are adjacent or concentric or situated at a distance, notably on distinct or opposite faces of the body, the shutoff valve or valves comprise at least one of the following: a valve shutter capable of translational movement relative to a respective seat and urged toward the seat by return member, a valve shutter incorporating a calibrated orifice allowing a predetermined flow rate to pass in the closed position corresponding to the first bore section of the circuit and allowing a second flow rate of gas in the open position corresponding to the first bore section of the circuit, a ball urged onto a seat by return member, the locking mechanism that locks the control member in its rest position may be of the mechanical and/or magnetic and/or pneumatic and/or electromechanical and/or hydraulic type, the locking mechanism that locks the control member is situated at least in part at one of the cams of the levers, the locking mechanism that locks the control member in its rest position comprises a rod attached to at least one cam and at least one groove formed in the other cam and that accommodates and guides the rod.

The invention also relates to a reservoir or collection of reservoirs for pressurized fluid, notably pressurized gas, comprising a valve according to any one of the features above or below.

The invention may also relate to any alternative device or method comprising any combination of the features above or below.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

Figure 1:
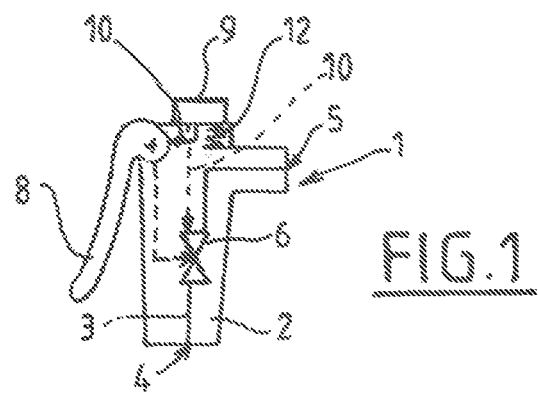
FIG. 1 is a schematic and partial view in cross section illustrating the structure and operation of a first possible embodiment of the invention.

The valve 1 illustrated in the figures comprises in the conventional way a body 2 housing a fluid circuit 3 having an upstream end 4 intended to be placed in communication with a reserve of pressurized fluid and a downstream end 5 intended to be placed in communication with a user of fluid.

The upstream end 4 may be connected to a pressurized gas cylinder 11 (see FIG. 5) or to circuitry connected to a pressurized-gas cylinder or several cylinders (rack of cylinders for example). For this purpose, the corresponding end of the body 2 of the valve 1 may be threaded.

The downstream end 5 opens for example onto an outlet connector for example.

The circuit 3 comprises a collection of valve shutter(s) comprising at least one shutoff valve shutter 6 allowing the circuit 3 to be closed or opened (isolation valve).

The valve 1 comprises a control member 8 for manual control of the collection of valve shutter(s) 6. In this example, the control member 8 is a lever mounted on the valve 1 with the ability to move. The control lever 8 is able to move between a rest position (FIG. 1) in which the collection of valve shutter(s) 6 remains closed (for example via a return member such as a spring) which corresponds to the circuit 3 being closed, and an active position in which the control member 8 actuates the collection of valve shutter(s) 6 into a position in which the circuit 3 is open with a first bore section S1 (notably fully open). For example, in its active position, the free end of the lever 8 is raised (moved away from the body 2 of the valve 1).

The valve 1 further comprises a locking mechanism locking the control member 8 in its rest position.

The locking mechanism comprises a manual actuator 9 mounted with the ability to move on the body 2 between a locked first position that locks the control member 8 to prevent it from moving from its rest position toward its active position, and an second position in which the control member 8 is unlocked allowing it to move from its rest position toward its active position.

What that means to say is that the manual actuator 9 has to be actuated by the user beforehand if he wishes to move the control lever 8 in order to open the circuit 3.

Figure 2:
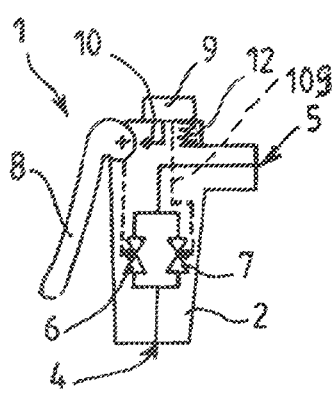
FIG. 2 is a schematic and partial view in cross section illustrating the structure and operation of a second possible embodiment of the invention.

According to one advantageous feature, when the actuator 9 is in its unlocked second position, the actuator 9 places the collection of valve shutter(s) 6 in a position in which the circuits 3 is open to a second bore section S2 (partially open). See, for example, the reference 109 in FIGS. 2 to 4 which schematically symbolizes a mechanical and/or pneumatic and/or hydraulic and/or magnetic actuator.

As a preference, the second bore section S2 is smaller than the first bore section S1 (the corresponding withdrawal flow rates are thus distinct). For example, the ratio S2/S1 between the second bore section S2 and the first bore section S1 may be comprised between 1/50 and 1/2, and preferably between 1/10 and 1/5. Thus, in order to be able to fully open the circuit 3 of the valve 1 using the lever 8, the user needs beforehand to actuate the distinct actuator 9 which unlocks the control lever 8 and partially opens the circuit.

Figure 3:
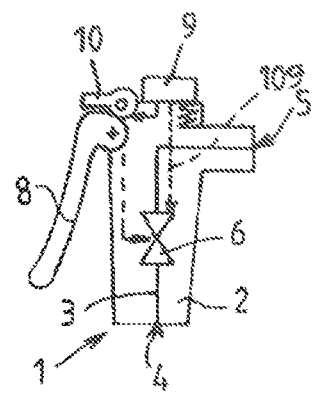
FIG. 3 is a schematic and partial view in cross section illustrating the structure and operation of a third possible embodiment of the invention in two distinct configurations of use, respectively.
Figure 4:
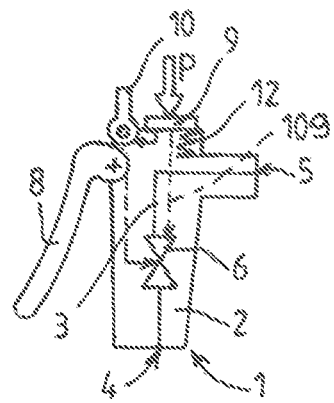
FIG. 4 is a schematic and partial view in cross section illustrating the structure and operation of a third possible embodiment of the invention in two distinct configurations of use, respectively.

See for example the schematic depiction of FIGS. 3 and 4: a pressure P on the actuator 9 allows the lever 8 to be unlocked.

This configuration affords a dual safety feature: 1) the need for unlocking, limiting unwanted openings, 2) the unlocking partially opens the circuit 3 thereby starting the process of progressive opening and alerting the user to the presence of gas at the outlet.

This makes it possible to reduce the pressure spike downstream by slowing the rate of pressurization of the downstream chamber of the gas circuit connected to the outlet 5 of the valve 1.

Figure 6:
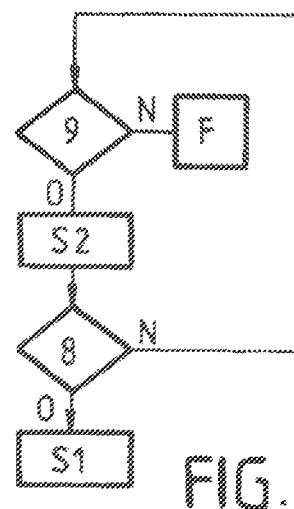
FIG. 6 is a schematic and partial view illustrating one example of the principle of operation of the invention.

FIG. 6 schematically illustrates the operation of the valve 1. If the actuator 9 is not activated (N) the circuit is closed (F). If the actuator 9 is actuated (O), the circuit 3 is open to a degree of opening S2, which then allows the lever 8 to be actuated. Actuation of the control lever 8 (O) allows the circuit to be fully opened (S1). Otherwise (N) the valve 1 returns to its closed or open position depending on the position of the actuator 9.

As a preference, the direction of actuation of the actuator 9 is the opposite (for example translation/push toward the body 2) of the direction of actuation of the control lever 8 (control lever 8 pulled up away from the body).

Thus, the movement of the control lever 8 from its rest position toward its active position preferably describes a movement of a different nature (or in a distinct direction, notably in an opposite direction) compared with the movement of the actuator 9 moving from its locked first position toward its unlocked second position. Of course, the direction of actuation or of movement of the actuator 9 (first control member 9) from its locked position toward its unlocked position may be identical or similar to the direction of actuation or of movement of the control lever 8 from its rest position toward its active position. For example, in order to lift the lever 8 (to move it away from the body) it is necessary beforehand to lift the actuator 9 (move it away from the body) likewise by a determined distance, for example a few centimeters. These two movements (lever 8 and actuator 9) may be parallel. The axes of rotation of the lever 8 and of the actuator 9 may notably be parallel.

Likewise, the return of the actuator 9 to its locked position and the return of the lever 8 its closed position may describe movements that are identical or identical directions (for example toward the body in this example).

Of course, the lever 8 and the actuator 9 may as an alternative have distinct movements (movements that are not parallel and/or that are different in nature rotation/translation etc.).

Thus, the movements of the lever 8 and of the actuator 9 may be rotations in the same direction or in opposite directions.

For example, when the actuator 9 has to be pulled in order to pass from its locked position to its unlocked position, in its first locked position the actuator 9 may have an end for grasping that lies along or facing the front face of the body 2 of the valve 1 (for example at a distance of between zero and 4 to 5 cm, and notably of between 1 and 3 cm). In the unlocked position, this end may be separated by 1 to 6 cm (or more from the front face of the body 2 of the valve 1), for example separated by 3 to 5 cm from the front face of the body of the valve 1. Conversely, in the case of an actuator 9 needs to be pushed (toward the body 2 of the valve), the locked position may be separated by 1 to 6 cm from the body of the valve, and the unlocked position may be separated from the body 2 by zero to 3 cm.

In its locked position and/or in its unlocked position, the actuator 9 (or at least a portion for grasping thereof) may have the same separation with respect to the body 2 of the valve as the control member 8 (or a portion for grasping thereof) which is in its rest position.

As a preference also, the actuator 9 is monostable, which means to say that the user has to maintain the force thereon in order to keep the travel active, otherwise it returns automatically to its locked first position (circuit 3 closed).

In order to do that, the valve 1 may comprise a return member 12 returning the actuator 9 toward its locked first position (notably a spring). Alternatively, the return member returning the actuator 9 toward its locked first position may comprise or consist of the pressure of the fluid in the circuit. What that means to say is that the service pressure of the gas in the circuit may apply to the actuator 9 a force which tends to return it to its first position.

The two degrees of opening S1, S2 of the circuit 3 may be achieved by a single valve shutter 6 having two respective open positions. However, as a preference, the two degrees of opening (S1, S2) are achieved via two distinct valve shutters 6, 7 (see FIG. 2 or 7).

As a preference, the control lever 8 has a travel which is bistable. What that means to say is that the rest and active positions are stable. For example, a hard-point stop mechanism (cam profile 14 of the lever 8) provides these stable positions. The user may release the control lever 8 in the active position without this release causing the circuit 3 to close.

As a preference, the closing of the circuit 3 (from a wide-open position S1) is achieved in a single gesture. As a preference, the control lever 8 and the actuator 9 are moved together into the initial position (circuit closed) via a coupling mechanism that couples the movement of the control member 8 and of the actuator 9. For example, this coupling mechanism automatically urges the actuator 9 toward its first position when the control member 8 is moved from its active position toward its rest position.

As a preference, the two control members 8, 9 can be manipulated with a single hand (in the direction of opening and/or in the direction of closing of the circuit).

Figure 5:
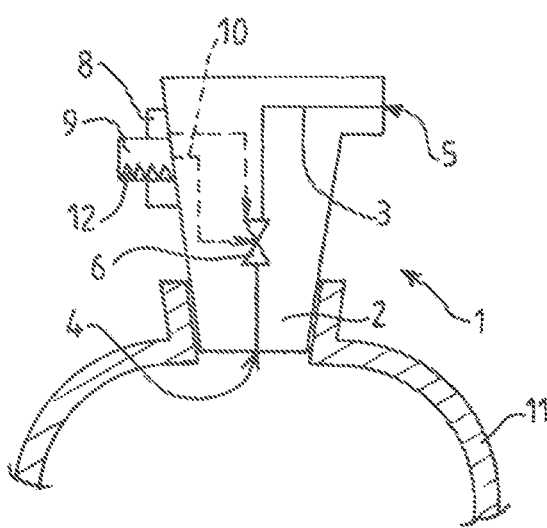
FIG. 5 is a schematic and partial view in cross section illustrating the structure and operation of a fourth possible embodiment of the invention.

As illustrated in FIG. 5, the control member 8 and the actuator 9 may be two push-buttons and/or rotary buttons, for example concentric. The actuator 9 and the control member 8 may however be any other type of member (lever, button, rotary selector, etc.) that are adjacent or concentric or situated at a distance, notably on distinct or opposite faces of the body 2 of the valve 1.

In the examples of FIGS. 7 to 12, the control member 8 and the actuator 9 are two levers 8, 9 that are adjacent and articulated to the body 2.

Figure 7:
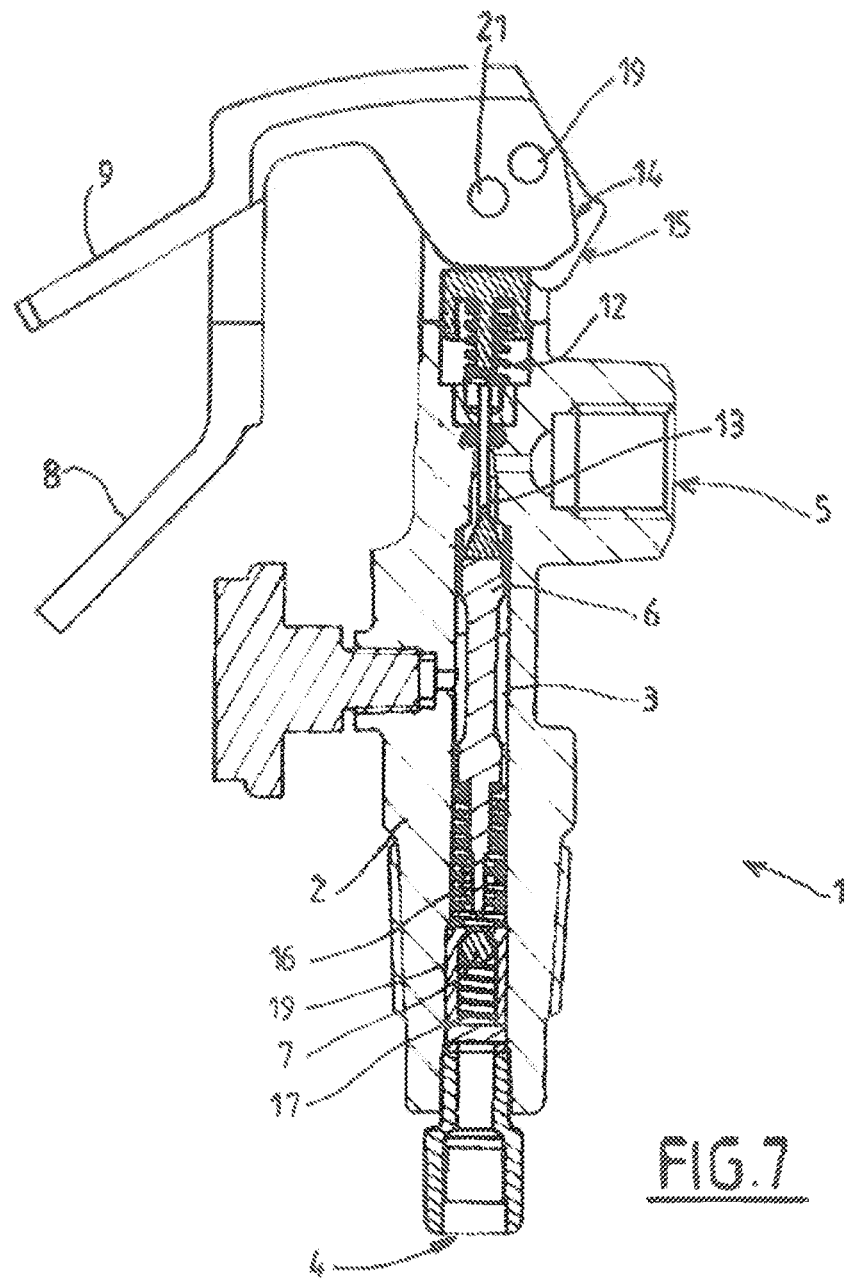
FIG. 7 is a schematic and partial view in cross section illustrating the structure and operation of a fifth possible embodiment of the invention.
Figure 8:
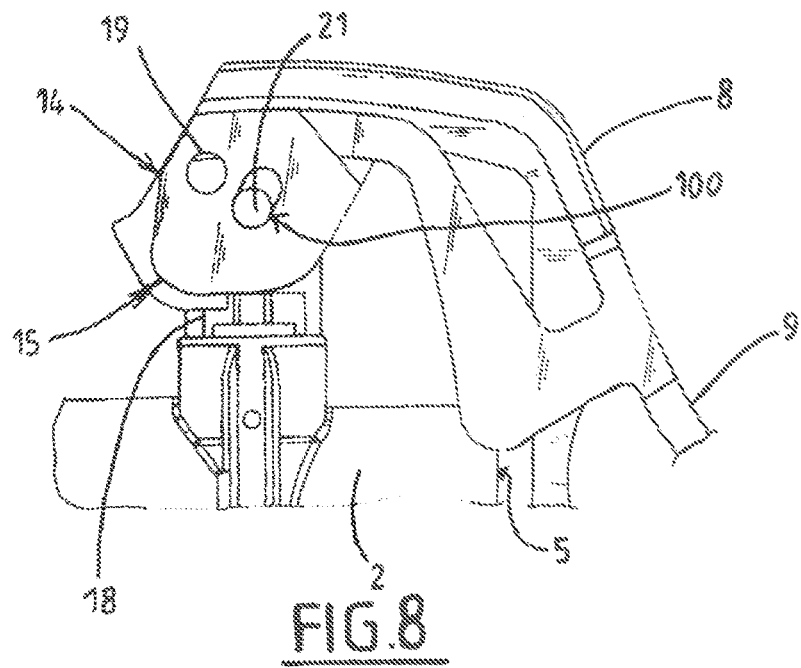
FIG. 8 is a schematic and partial side view illustrating a detail of the structure of a valve in a sixth possible embodiment of the invention, and in a first configuration of use.

As illustrated in FIG. 7, the valve 1 may comprise two distinct shutoff valve shutters 6, 7 able to move with respect to respective seats and respectively defining, according to their sequence of opening (one, 6, of them open and then both, 6, 7 open), the two distinct wall sections S2, S1).

As illustrated, the two distinct shutoff valve shutters 6, 7 may be arranged in series in the circuit 3. This first valve shutter 6 is for example able to move in translation with respect to a seat and forced toward the seat. In the closed position, the first valve shutter 6 may sealingly close the circuit.

In the closed position, the second valve shutter 7 non-sealingly closes the circuit 3. What that means to say is that the second valve shutter 7 has a calibrated orifice defining the second bore section S2 of the circuit 3.

The second valve shutter 7 comprises for example a ball 7 pushed toward a seat by a spring 17. For example, the ball 7 bears non-sealingly against a seat (for example a bushing) with a predetermined spacing (bore section S2).

The passage (second bore section S2) between the ball 7 and the seat (bushing) can be obtained by impairing the line of sealing between the ball and its seat by broaching, or by a stroke with a saw or another tool on the ball or on its seat. The ball 7 can be not perfectly cylindrical (faceted ball, porous ball, or ball of any other shape that allows the gas to pass at a limited flow rate).

Another alternative solution is to place a calibrated orifice in parallel with this second valve shutter 7 in order to provide the limited passage of gas. Alternatively, this calibrated orifice may pass through the body of the valve shutter 7.

Thus, when the actuator lever 9 is actuated (for example by pushing it toward the body or respectively by pulling it away from the body), a cam 15 of this lever 9 moves the first valve shutter 6 via a movement transmission mechanism 109. The movement transmission mechanism 109 may notably comprise one or more pushrods 13, 18 in series (or in parallel), an elastic member 12 (notably a spring to compensate for lash and/or to maintain contact in a drivetrain transmitting movement between the cam 15 and the valve shutter 6). Any other movement transmission mechanism may be envisioned. Reference may be made for example to document FR2828922A1.

Actuation of the actuator lever 9 moves the movement transmission mechanism by a first travel which in its turn moves the first valve shutter 6 which opens the circuit 3 at the first valve shutter 6. The gas which is permitted to pass through the calibrated orifice of the second valve shutter 7 can thus escape toward the second end 5 of the circuit 3. The gas coming from the first end 4 of the circuit 3 effectively passes between the ball 7 and the bushing 19 and then between the body 2 and the valve shutter 6 and can leave the valve 1.

The system of locking of the control lever 8 can be located at the cam 14 thereof.

Figure 9:
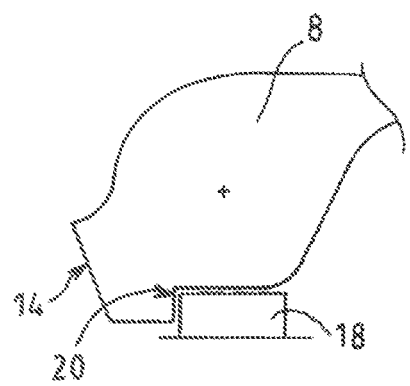
FIG. 9 depicts an enlarged view in cross section of a detail of FIG. 8.
Figure 10:
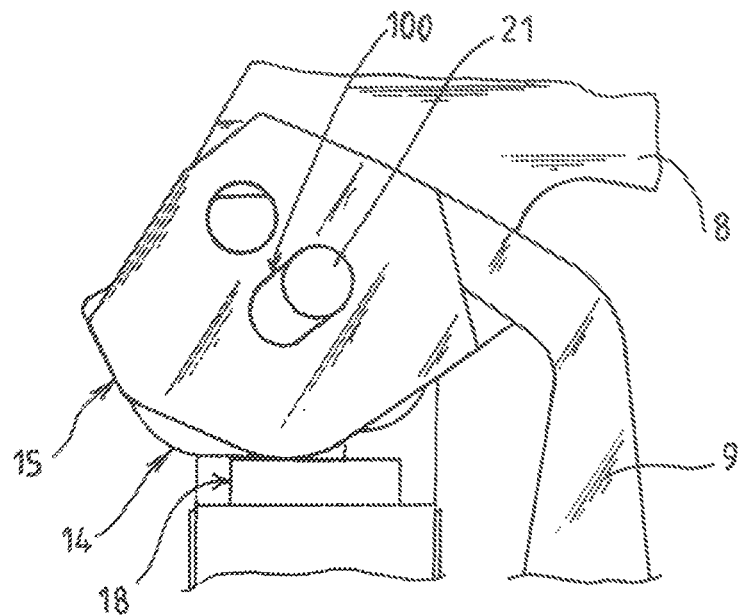
FIG. 10 depicts a view similar to that of FIG. 8, illustrating a detail of the structure of FIG. 8 in a second configuration of use.
Figure 11:
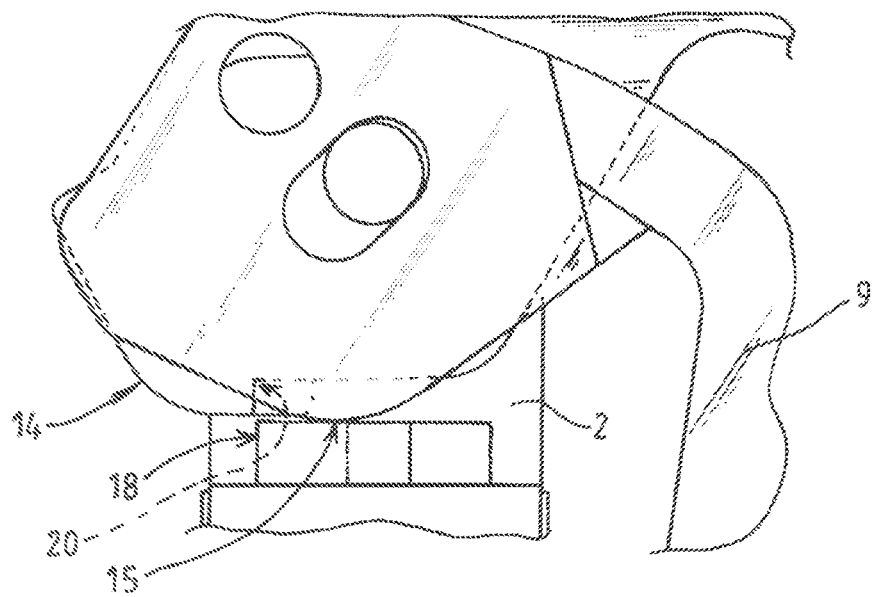
FIG. 11 depicts a view similar to that of FIG. 10, partially showing hidden detail.

For example, the profile of the cam 14 of the control lever 8 may comprise a shape 20 which comes into abutment with a complementary shape belonging to the movement transmission mechanism (and notably the end of a pushrod 18, see FIG. 9). In the raised position (actuator 9 in the locked position, see FIG. 7, 8 or 9), the movement transmission mechanism (and notably the end of a pushrod 18) forms a mechanical stop preventing the control lever 8 from rotating.

In the lowered position (actuator 9 in the unlocked position, see FIG. 10 or 11), the movement transmission mechanism (and notably the end of a pushrod 18) is retracted and no longer forms a mechanical stop preventing the control lever 8 from rotating.

At the end of this first travel, the control lever 8 is thus unlocked and a reduced flow rate of gas is released.

This first travel thus allows the pushrod 18 to be positioned beyond an angle of abutment at the profile 20 of the cam 14.

Figure 12:
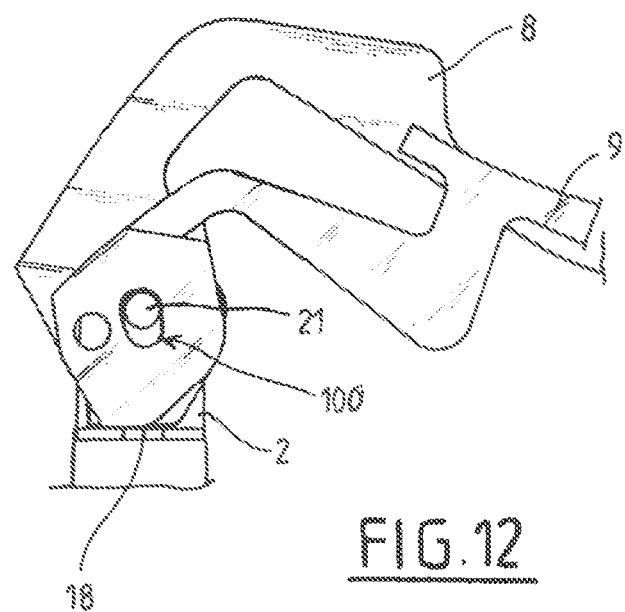
FIG. 12 depicts a view similar to that of FIG. 8, in a third configuration of use.

The control lever 8 can then be pivoted in its turn (for example in order to move it away from the body) in order to move the mechanism 18, 13 a little further (second travel) see FIG. 12. This second travel allows the second valve shutter 7 (ball) to be moved off its seat (via the end of the first valve shutter 6).

In this configuration, the circuit 3 is open more extensively (fully, first bore section S1). This allows the gas a higher flow rate and a more rapid rise in pressure downstream of the valve shutters.

As illustrated in the example of FIG. 12, when the control lever 8 is lifted up (active position) the actuating lever 9 may (or possibly must) be likewise lifted up. Of course, as an alternative, the actuating lever 9 could remain in the lowered position (close to the body when the control lever 8 is lifted up into the active position).

In this way, the two valve shutters 6, 7 can be controlled by the one same movement transmission mechanism and notably at least one same mobile pushrod 18, 13.

This movement transmission mechanism may effect a translational movement by two different travels, the one a short travel allowing a limited flow rate (second bore section S2), and the other a long travel allowing the full flow rate (first bore section S1).

Of course, the invention is not restricted to the example of the Figures described hereinabove. The lever mechanisms 8, 9 may be replaced by rotary handwheels or other mechanisms. For example, the cam or cams 14, 15 could be actuated by rotary handwheels.

The two travels of the movement transmission mechanism may be controlled by cams having axles of rotation 21, 19 of the levers 8, 9 that are identical (coincident) or distinct.

As a preference, the full (re-)closure of the two valve shutters 6, 7 may be brought about in a single gesture which allows the two valve shutters 6, 7 to be neutralized in the one same manual action.

For example, a mechanism for coupling the movement of the control member 8 and of the actuator 9 can be incorporated into the cams 14, 15 of the levers.

For example, a rod 21 attached to at least one cam 14 may be housed in at least one groove 100 formed in the other cam 15 and accommodating and guiding the rod 21.

Thus, the movement of the control lever 8 toward its rest position also causes the return of the actuating lever 9 toward its locked position.

Conversely, when the actuating lever 9 has been positioned in its unlocked second position, the movement of the control lever 8 toward its active (for example raised) position may also cause the actuating lever 9 to move (to be lifted up for example).

Of course, the invention is not restricted to the examples hereinabove. For example, the locking mechanism could be incorporated into the cams 14, 15 via a system of rods 21 and grooves of the same type as that of the coupling mechanism. Likewise, this locking mechanism for the control member 8 could be located elsewhere on the valve. In addition, this locking mechanism could be of the magnetic and/or pneumatic and/or electromechanical and/or hydraulic type.

It will therefore be appreciated that, while being simple and inexpensive in structure, the invention offers numerous advantages.

This valve structure also offers the user other functionalities. Thus, brief actuation of the actuator 9 alone allows the user to generate a jet of gas that is sufficient and controlled for purging/cleaning the downstream part of the circuit 3 and notably the outlet connector. This is notably a measure recommended by valve manufacturers.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A valve for pressurized fluid comprising:
   a body housing a fluid circuit having an upstream end configured to be placed in communication with a reserve of pressurized fluid and a downstream end configured to be placed in communication with a user of fluid, the circuit comprising a collection of valve shutter(s) comprising at least one shutoff valve shutter allowing the circuit to be closed or opened;
   a member for manually controlling the collection of valve shutter(s), the control member being mounted with the ability to move on the body between a rest position in which the collection of valve shutter(s) in the circuit are closed and an active position in which the control member actuates the collection of valve shutter(s) such that the circuit is open with a first bore section; and
   a mechanism for locking the control member in the rest position, the locking mechanism comprising a manual actuator mounted with the ability to move on the body between a locked first position that locks the control member thereby preventing movement from the rest position toward the active position and a second position in which the control member is unlocked allowing movement from the rest position toward the active position, wherein in the unlocked second position, the actuator positions the collection of valve shutter(s) such that the circuit is open to a second bore section,
   wherein the control member is a lever articulated to the body, the actuator is a lever articulated to the body, and the two levers each comprise a respective cam having a respective cam profile and collaborating with at least one mobile pushrod for control of the collection of shutoff valve shutter(s).

2. The valve as claimed in claim 1, wherein the second bore section is smaller than the first bore section.

3. The valve as claimed in claim 1, further comprising a return member returning the actuator toward the locked first position.

4. The valve as claimed in claim 1, further comprising a retaining mechanism providing retention of the control member at least in the active position.

5. The valve as claimed claim 1, further comprising a coupling mechanism that couples the movement of the control member and of the actuator when the control member is moved from the active position toward the rest position and/or from the rest position toward the active position, the coupling mechanism automatically moving the actuator when the control member is moved.

6. The valve as claimed claim 1, wherein the at least one shutoff valve shutter comprises first and second shutoff valve shutters able to move with respect to respective seats and in the open position respectively defining the two bore sections, the first and second shutoff valve shutters being controlled by the control member and by the actuator, respectively.

7. The valve as claimed in claim 6, wherein the first and second shutoff valve shutters are arranged in series in the one same line of the circuit.

8. The valve as claimed in claim 7, wherein the first and second shutoff valve shutters are controlled by the at least one mobile pushrod controlled by the control member and by the actuator.

9. The valve as claimed in claim 8, wherein the movement of the actuator from the locked first position toward the unlocked second position moves the pushrod over a first travel that actuates the opening of a first valve shutter(s) into an open position with the second bore section for the circuit, and wherein the subsequent movement of the control member from the rest position toward the active position moves the pushrod over a second travel actuating the opening of the second valve shutter such that the circuit is open with the first bore section.

10. The valve as claimed in claim 1, wherein the locking mechanism for locking the control member in the rest position comprises a mobile mechanical stop.

11. A reservoir or collection of reservoirs for pressurized fluid, comprising a valve as claimed in claim 1.

* * * * *